United States Patent [19]

Christensen et al.

[11] Patent Number: 5,776,534
[45] Date of Patent: Jul. 7, 1998

[54] FOOD APPARATUS FOR FORMING MULTIPLE COLORED EXTRUDATES AND METHOD OF PREPARATION

[75] Inventors: John C. Christensen, Sylvania, Ohio; Thomas G. Cremers, Belle Plaine, Minn.; James L. Stinson; Philip K. Zietlow, both of Wayzata, Minn.

[73] Assignee: General Mills, Inc., Minneapolis, Minn.

[21] Appl. No.: 627,864

[22] Filed: Apr. 3, 1996

[51] Int. Cl.⁶ .................. A21C 5/00; A21D 2/00
[52] U.S. Cl. .......... 426/516; 99/484; 264/176.1; 425/382 R; 425/382.4; 425/464; 426/249; 426/519
[58] Field of Search .............. 426/516, 517, 426/519, 249; 425/382 R, 382.4, 464; 264/176.1, 211.13; 99/484

[56] References Cited

U.S. PATENT DOCUMENTS

| | | |
|---|---|---|
| 3,064,680 | 11/1962 | Winslow, Jr. . |
| 3,307,503 | 3/1967 | Elmer, Jr. et al. . |
| 3,575,352 | 4/1971 | Hall et al. . |
| 3,667,732 | 6/1972 | Lejeune . |
| 3,792,839 | 2/1974 | Gidge . |
| 3,857,551 | 12/1974 | Troy . |
| 3,936,382 | 2/1976 | White . |
| 4,003,554 | 1/1977 | Chauffoureaux . |
| 4,027,858 | 6/1977 | Dettmer . |
| 4,170,446 | 10/1979 | Schutz et al. . |
| 4,198,168 | 4/1980 | Penn . |
| 4,208,136 | 6/1980 | King . |
| 4,249,877 | 2/1981 | Machen . |
| 4,372,734 | 2/1983 | Dolan et al. . |
| 4,382,684 | 5/1983 | Hori . |
| 4,454,804 | 6/1984 | McCulloch . |
| 4,540,537 | 9/1985 | Kamp . |
| 4,614,440 | 9/1986 | King . |
| 4,616,779 | 10/1986 | Serrano et al. . |
| 4,616,937 | 10/1986 | King . |
| 4,753,535 | 6/1988 | King . |
| 4,772,197 | 9/1988 | Heck . |
| 4,808,007 | 2/1989 | King . |
| 4,873,104 | 10/1989 | Butcher et al. ............... 426/249 |
| 4,925,380 | 5/1990 | Meisner ............... 426/249 |
| 4,945,807 | 8/1990 | Loomans et al. . |
| 5,110,276 | 5/1992 | Farnsworth et al. . |
| 5,120,554 | 6/1992 | Farnsworth et al. . |
| 5,486,049 | 1/1996 | Boatman et al. . |
| 5,536,517 | 7/1996 | Hannaford . |
| 5,620,713 | 4/1997 | Rasmussen . |

FOREIGN PATENT DOCUMENTS

| | | |
|---|---|---|
| 1230005 | 12/1987 | Canada . |
| 663974 | 8/1929 | France . |
| 935418 | 6/1948 | France . |
| 1261312 | 4/1961 | France . |
| 1304737 | 8/1962 | France . |
| 1704754 | 5/1971 | Germany . |
| 581493 | 11/1976 | Switzerland . |
| 725689 | 4/1980 | U.S.S.R. . |

OTHER PUBLICATIONS

Motionless Mixers Stir Up New Uses, Koch Engineering Company, Inc., P.O. Box 8127, Wichita, Kansas 67208, Chemical Engineering Progress, Jun. 1991, pp. 31–40.

*Primary Examiner*—George Yeung
*Attorney, Agent, or Firm*—John A. O'Toole; L. MeRoy Lillehaugen; Alan D. Kamrath

[57] ABSTRACT

An apparatus (10) for forming a single extrudable food stream such as a cooked cereal dough into a plurality of differently colored and/or flavored dough streams is disclosed including an extruder having screw augers in a main passageway for advancing a plastic food mass, a device for dividing the plastic food mass into a plurality of substreams such as a branching passageway section in fluid communication with a plurality of sub-divided dough passageways, and a die head having a plurality of die ports for each subpassageway. Each subpassageway has a separate conduit for supplying an additive and has disposed therein a multiplicity of in-line static mixer elements to admix the additive into the substreams of the plastic food mass before passage through the die ports.

34 Claims, 5 Drawing Sheets

5,776,534

1

FOOD APPARATUS FOR FORMING MULTIPLE COLORED EXTRUDATES AND METHOD OF PREPARATION

FIELD OF THE INVENTION

The present invention generally relates to food processing apparatus and methods. More particularly, the present invention relates to apparatus and methods for dividing and coloring and/or flavoring a continuous stream of extrudable food material into a plurality of substreams each of a distinct color and/or flavor.

BACKGROUND

Extruders are often used in the preparation of various food products and especially in the preparation of ready-to-eat ("RTE") cereals such as puffed. Extruders, especially cooker extruders, are desirable because a single machine can produce large quantities of a cooked cereal dough in a short period of time. Such cooker extruders can be used to prepare cooked dough extrudates which can thereafter be formed into individual cereal or snack pieces, with the formation of such pieces possibly involving puffing the pieces to form finished puffed RTE cereals. In another variation that is increasingly popular, the conditions of the extruder and the cooked cereal dough are such that the dough puffs immediately upon being extruded and is cut into individual puffed pieces at the die head. Such a process is referred to generally as "direct expansion." While the preparation of a puffed or "direct expanded" extrudate is desirable, it may be desirable to produce a variety of products having different colors, flavors, or similar additives. For example, RTE cereal blends that comprise a mixture of differently shaped pieces are desirable, with each shape having a distinctive color and/or flavor.

In current practice, in order to produce an RTE cereal blend of distinctive colors, shapes or flavors, a sequence of individual color/flavor runs are made. The product from each run is collected and subsequently admixed to form the blend. For instance for a direct expanded product, a first colored cooked cereal dough is prepared by adding color to the starting material or by injecting a color into the dough upstream of the dieface. The colored dough is directly expanded through a shaped dieface and face cut as it expands to form individual pieces. To prepare, for instance, a second color and shape, the first color injection is discontinued and a second different color material is injected into the cooked cereal dough. To prepare a second shape, the first die head is removed and substituted with a die head having the desired second shape.

While effective, one problem with this conventional practice resides in the generation of unusable scrap material during the color addition transition as the new color is admixed with the residual amounts of the prior color. Still more scrap is generated as the extruder comes up to steady state conditions after the second color run is started. A second problem is that the various colored pieces must be collected in large batches to be admixed at a later time to form the blended RTE cereal. The properties (e.g., plasticity, temperature, moisture content, starch conditions, frangibility, etc.) of the finished pieces may deteriorate over the storage period. A third problem relates to the broken pieces, dust and/or cereal fines created by the admixing step.

It would thus be desirable to be able to provide at least two and preferably a multiplicity of streams of cooked cereal dough from a single extruder, with each of the streams having a distinct color, flavor and/or similar additive.

2

Accordingly, it is an object of the present invention to provide apparatus and methods for providing a plurality or multiplicity of dough streams from a single extruder wherein each of the streams has a distinct color and/or flavor.

While color injection into a cooked cereal dough is well known, another problem resides in the complete blending of the color into the dough without changing the properties of the dough by imparting significantly more shear into the dough.

DESCRIPTION OF THE DRAWING

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DESCRIPTION OF THE PREFERRED EMBODIMENTS

Figure 1:
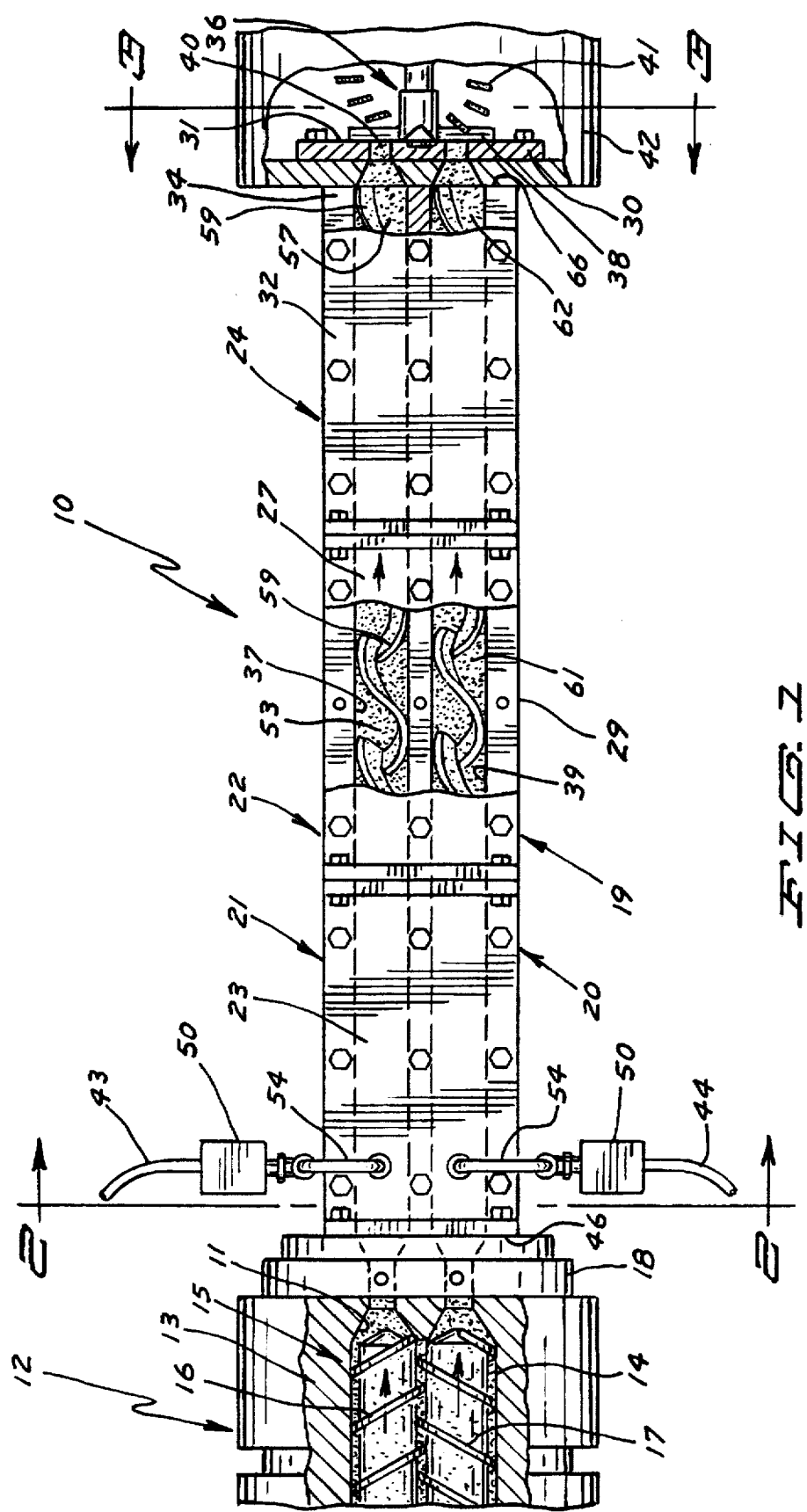
FIG. 1 is a plan view of a food apparatus of the present invention for forming multiple colored extrudates from a single extruder partially cut away to show in-line static dough mixers and further showing a single face cutter.

Referring now to the drawing and briefly in particular to FIG. 1, there is shown an apparatus 10 for providing at least two and preferably a multiplicity of mass substreams of a plastic food material from a single product mass main supply, with each of the streams having a distinct color and/or flavor, according to the preferred teachings of the present invention. In the preferred form, apparatus 10 generally includes a means for providing at least one extrudable food product 11 in a mass stream such as an extruder 12, an intermediate in-line static mixer element section 19 and a multi-port extrusion die head 30. Section 19 includes a plurality of sub-divided dough subpassageways 37 and 39 extending from the extrudable food product means 12. Each subpassageway 37 and 39 has disposed therein a multiplicity of in-line static mixer elements 59 and has a separate means for supplying a colorant, flavor and/or similar additive to the subpassageway 37 and 39. Multi-port extrusion die head 30 has at least one individual die for each subpassageway 37 and 39. The present invention finds particular suitability for use in connection with the provision of cereal doughs and especially cooked cereal doughs for the production of RTE cereals or grain based snacks.

While the extruder 12, preferably a cooker extruder, is the preferred equipment to provide the extrudable food 11, other conventional equipment and techniques can be employed. For example, a batch cooker or semi-continuous cooker for cooking the ingredients in bulk can be equipped with a dough forming and conveying extruder element. In other embodiments, e.g., a low moisture fruit paste or a pasta dough, a simple screw conveyor can be employed.

Moreover, while in the present description particular reference is made to the provision of multiple extrudates of farinaceous materials such as cooked cereal doughs for the preparation of RTE cereals, the skilled artisan will appreciate that the present apparatus and techniques can be employed with a wide variety of extrudable food products, especially such plastic foods as 1) low moisture fruit products, 2) uncooked cereal doughs such as for pasta, cookies, or breadstuffs, 3) potato doughs such as for fabricated potato snacks, 4) chewing gums, 5) cheeses and cheese products, or 6) yogurts.

Extruder 12 can be any convenient type of food extruder for providing the extrudable food product 11. While single screw extruders are useful herein, FIG. 1 shows the preferred embodiment wherein a twin screw cooker extruder 12 is employed. In particular, extruder 12 can be seen to include an extruder barrel 13 having a main passageway 14. Disposed within passageway 14 is a twin screw auger 15 for advancing the extrudable food material 11 through a discharge outlet, with twin auger 15 in the preferred embodiment including a first and second or twin screw intermeshed flights 16 and 17, respectively.

The dough plastic food mass is extruded through and apparatus 10 further includes a means for dividing the dough stream into at least a first and second dough mass substreams disposed within subpassageways 37 and 39 such as the "Y" divider head or manifold 18. Manifold 18 has exit ports equal in number to and in fluid communication with first and second extended substream subpassageways 37 and 39 formed within a static mixer housing 20.

Figure 2:
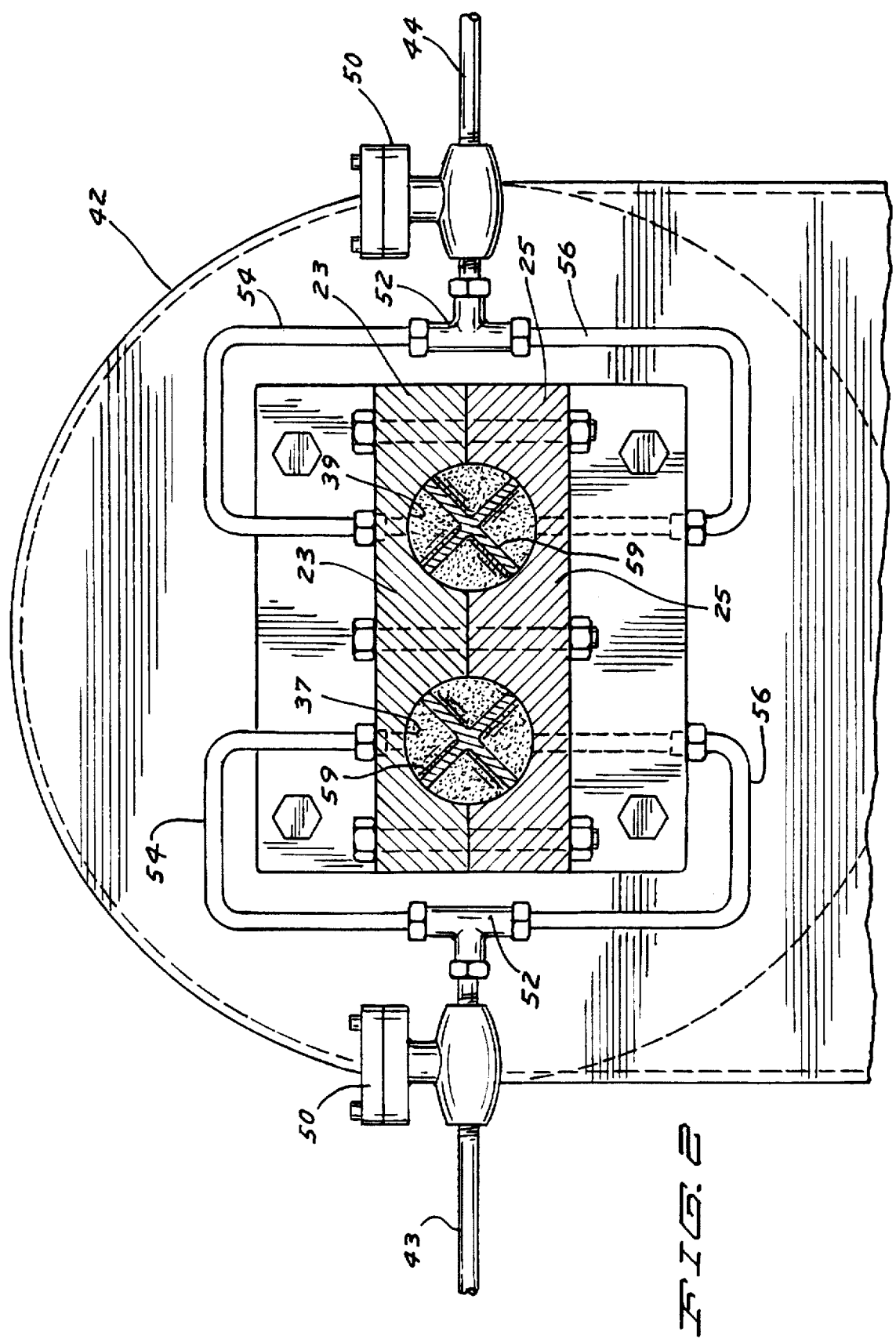
FIG. 2 is an enlarged sectional view of the dough mixer taken along lines 2—2 of FIG. 1.
Figure 3:
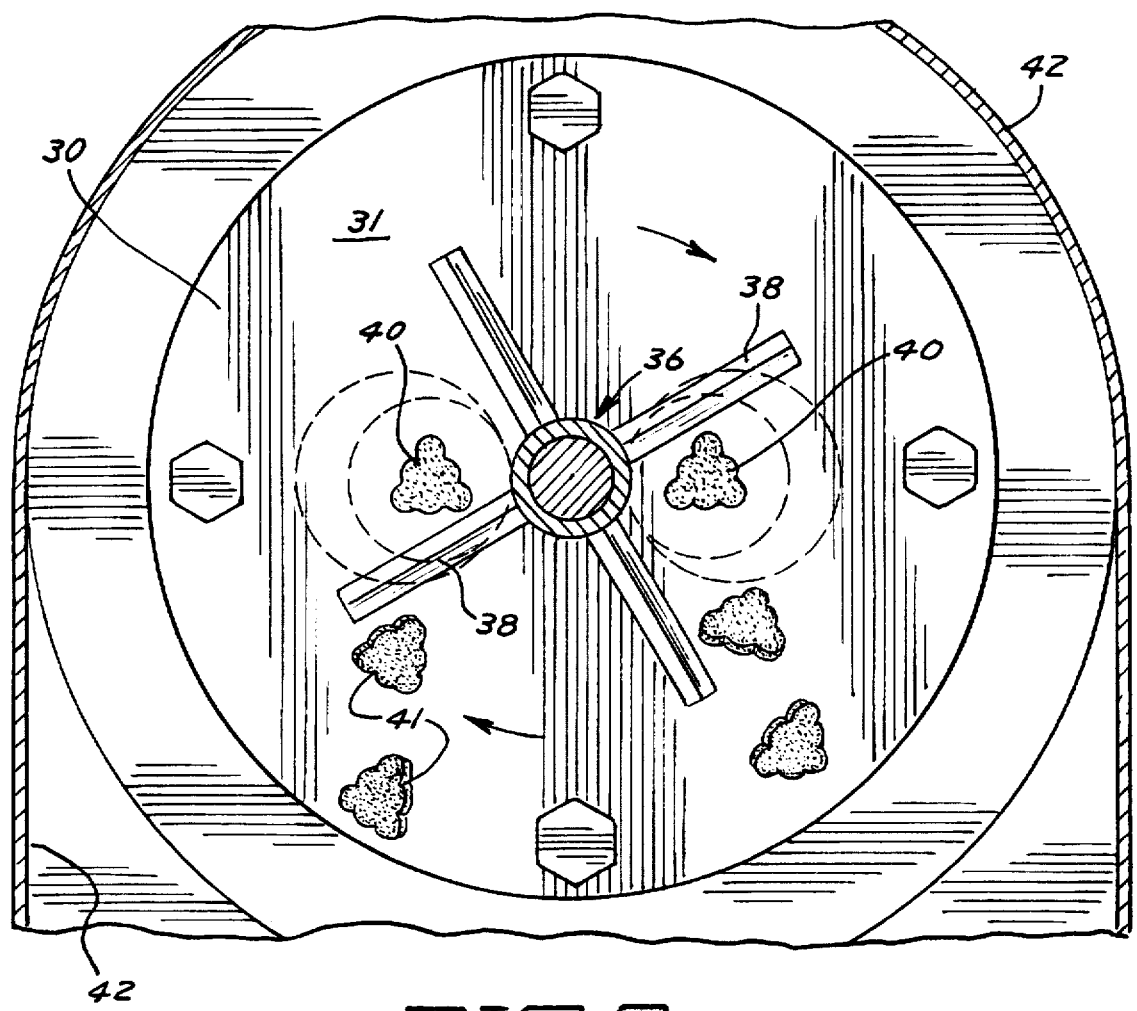
FIG. 3 is a greatly enlarged sectional view showing the face cutter taken along lines 3—3 of FIG. 1.
Figure 4:
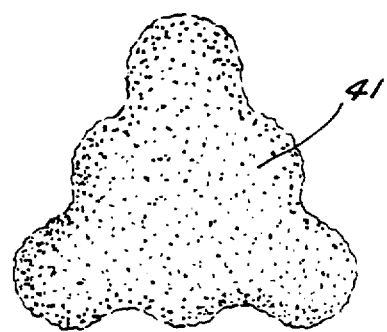
FIG. 4 is a greatly enlarged plan view of a cereal or snack piece product formed by the apparatus and methods of the present invention.
Figure 5:
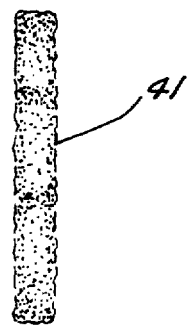
FIG. 5 is a greatly enlarged side view of the product of FIG. 4.
Figure 6:
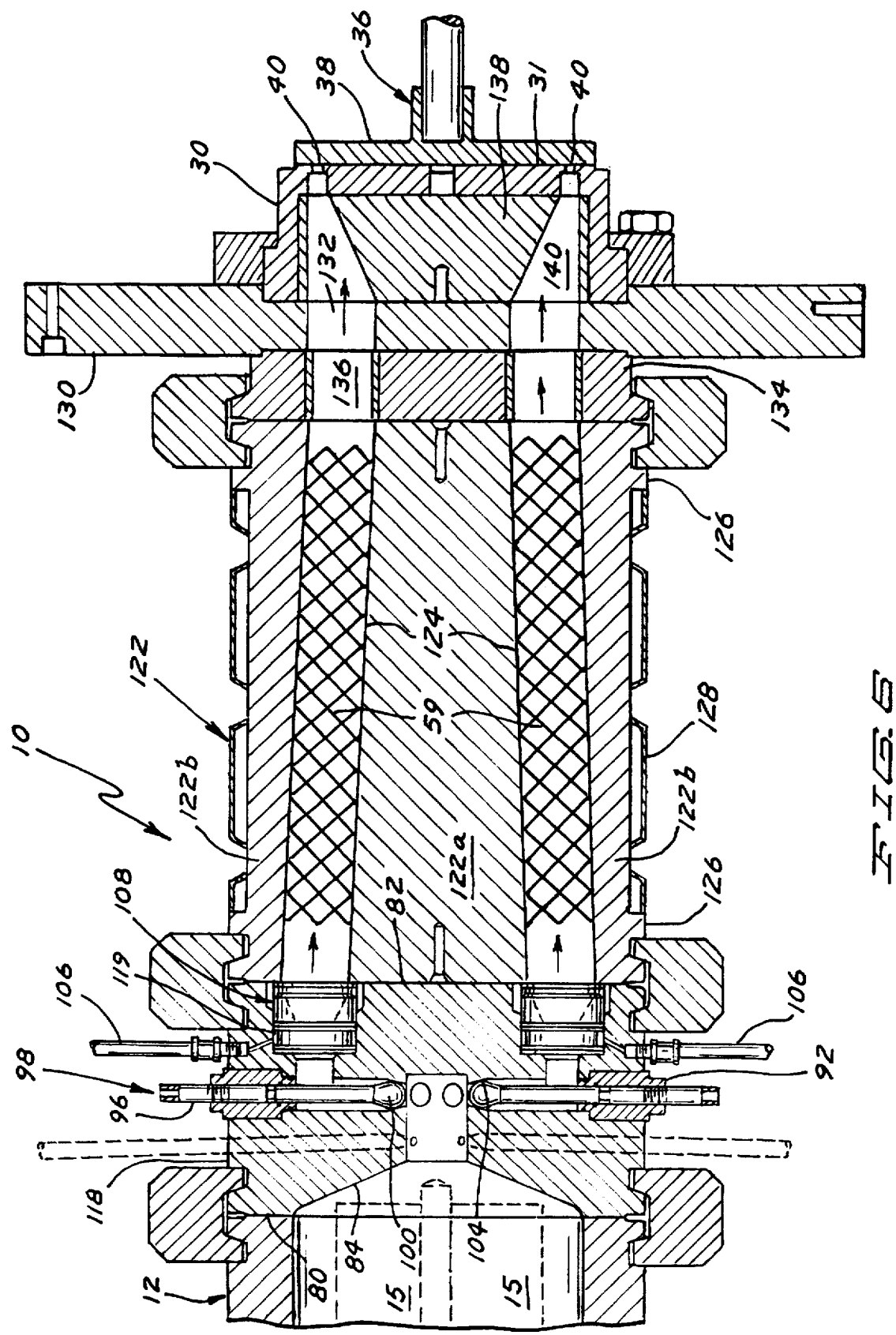
FIG. 6 is a sectional view of an alternate embodiment of a food apparatus of the present invention for forming multiple colored extrudates from a single extruder.
Figure 7:
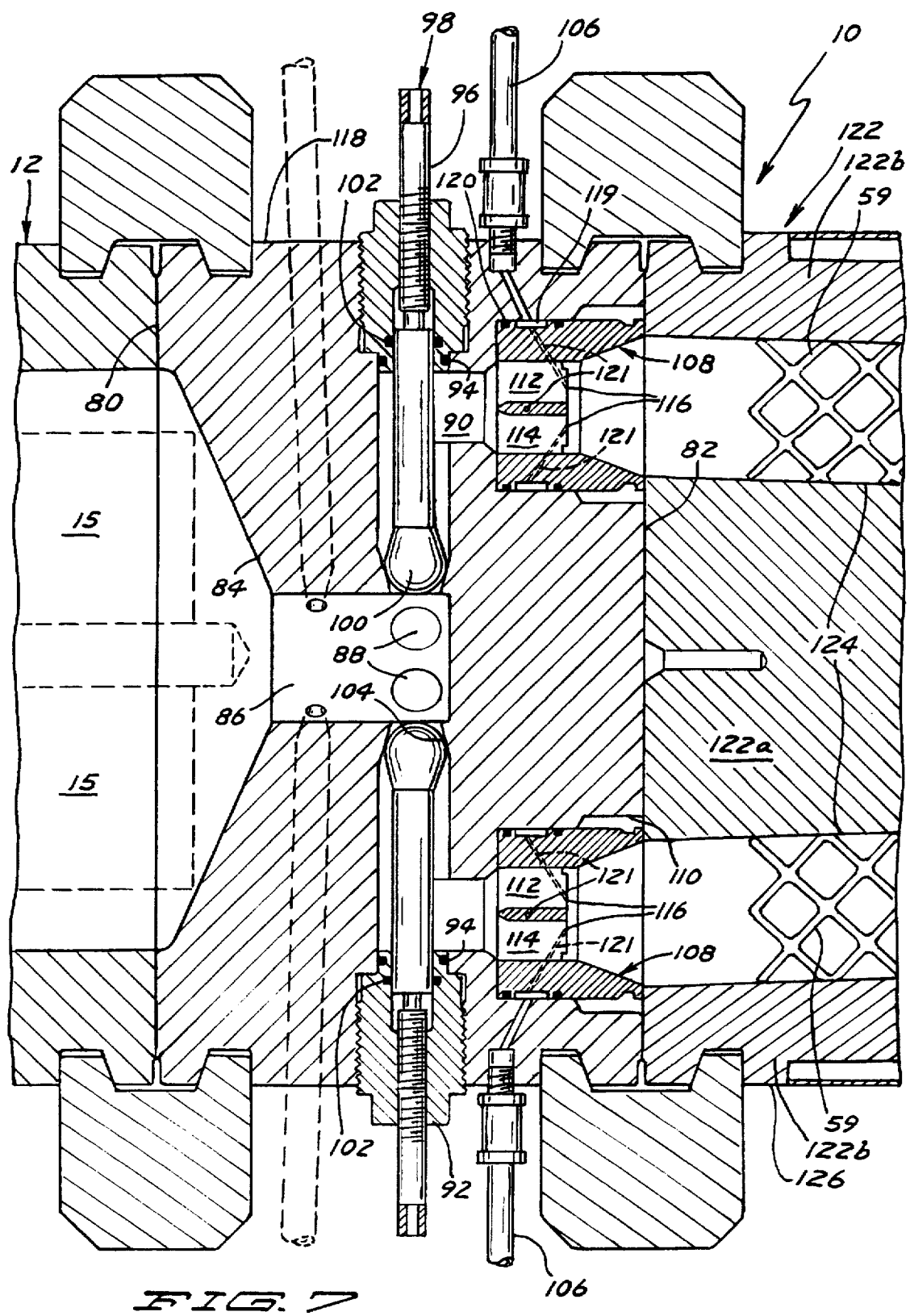
FIG. 7 is a partial, elongated sectional view of the apparatus of FIG. 6.

While the present apparatus 10 of FIGS. 1-3 is depicted as dividing the dough into two substreams, the skilled artisan will appreciate still further that in other variations, the dough can be divided into a greater number of substreams, (e.g., three to 10) as will be set forth in the embodiment of FIGS. 6 and 7. In addition to the relatively simple, two-way divider head 18 depicted, also useful herein for the dough dividing means or divider head 18 division of the dough stream into multiple substreams are the apparatus and techniques described in commonly assigned copending application U.S. Ser. No. 08/353,477 filed 9 Dec. 1994 entitled "Apparatus and Methods For Making Multiple, Complexly Patterned Extrudates" which is incorporated by reference. In the referenced application, the apparatus includes a flow rate adjustment apparatus for adjustment of plastic extrudable food flow in a manner where the flow of dough is not totally stopped or allowed to build up to minimize product hardening. The dough flow rate adjustment apparatus includes a rounded plug having a flat bottom and retractably adjustable perpendicular to the axis of the passageway. Such a dough flow rate adjustment apparatus is particularly useful when the dough is divided into a higher number, e.g., four, five, six or even greater, of subpassageways 37 and 39. Absent such a flow rate adjustment means, the particular extrudate characteristics (e.g., pressure, mass flow) from each of so many orifices are difficult to control since the length of passageway 14 from the central supply can vary.

Internal obstructions (e.g., shoulders) are to be avoided so as to provide a continuous passageway to minimize product buildup and hardening.

In the preferred form, housing 20 is fabricated into a sequentially abutting first or upstream portion or segment 21 having an inlet end 46, a second or middle segment(s) 22 and a third or downstream segment 24 having an outlet end 66. First segment 21 can be seen, in FIG. 2, to include an upper housing element 23 and a lower element 25 removably fastened together. Similarly, each middle segment 22 includes an upper element 27 and a lower element 29 similarly removably fastened together. Downstream segment 24 likewise includes an upper element 32 and lower element 34 similarly removably fastened together. By having the combination of segments and upper and lower elements, access to the substream passageways 37 and 39 is made more convenient. The particular construction allows for removal of the upper element for any segment for access without total disassembly of in-line static mixer element 19. Such access is helpful should blockage of either subpassageway 37 or 39 occur.

The segments and upper and lower elements are seen to be conveniently removably held together using conventional fasteners and include suitable seals therebetween (not shown).

Of course, while in the preferred embodiment, three segments 21, 22, and 24 are depicted, the length of the intermediate section is adjustable by including additional or by subtracting segments.

Moreover, while two subpassageways 37 and 39 are depicted in FIGS. 1-3 as being horizontally aligned, other orientations, e.g., vertically or concentric, can also be employed.

Also, intermediate in-line static mixer element section 19 can be fabricated with a heat transfer means such as a jacket for adding heat or cooking to the food mass during mixing.

In still other variations, the interior surfaces of subpassageways 37 and 39 can be treated to minimize dough buildup or sticking to the interior surface. Exemplary treatments can include polishing the interior surface such as by electro-polishing and specifically to a surface roughness of less than 1.6 micrometers to about 0.012 micrometers and preferably to a surface roughness in the range of 0.8 to 0.1 micrometers. Other exemplary treatments can include coating the interior surface with an anti-stick coating.

Referring now briefly to FIG. 3, it is seen that die head 30 includes an outer dieface 31 having multiple exit dieports such as 40 having a particular shape and construction to form the extrudate into a desired shape. Each subpassageway 37 and 39 has at least one dieport 40 for extrusion of the food product. In preferred embodiments, apparatus 10 additionally includes a means for sectioning or severing the extrudate ropes into individual pieces 41 such as a conventional face rotary cutter 36. The face cutter 36 includes at least one rotating cutter knife 38 which sweeps the outer face of the die head 30 to form the extrudate into individual pieces 41 as shown. For safety, apparatus 10 can include an expansion collect cage 42 to prevent scattering of the individual pieces 41. Also useful but less preferred for use herein (not shown) are reciprocating knife cutters.

In other variations, the individually colored product streams are extruded as extrudate ropes which can be conveyed away for further processing such as by a continuous take-away belt (not shown).

Referring now again to FIG. 1, importantly, each substream passageway such as 37 and 39 essentially includes its own independent color, flavor, or similar additive supply such as the first color, flavor, or additive supply means 43 and second color, flavor, or additive supply means 44. By having separate additive supply means exclusively for each subpassageway 37 and 39 without communication to the other subpassageways and which can supply a flowable food additive such as a food color liquid (whether oil or preferably water based), each passageway 37 and 39 can be supplied with a different color, flavor, or similar additive allowing for the production of separately colored or flavored dough streams. Different color/flavor streams can be more easily controlled.

In one variation, especially for directly expanded products, the food additive can comprise or include a nucleating agent such as tricalcium phosphate, calcium carbonate, or mixtures in powder form. The powdered material is used to adjust the puff characteristics of the cooked cereal dough. It is believed that the nucleating agents act as seed sites for cell formation during the expansion step.

Now referring briefly to FIG. 2, it can be seen that each flavor, color, or similar additive supply means such as the first additive supply means 43 can include a supply line operatively connected between a fluid supply reservoir and the subpassageway. Specifically, supply means 43 includes a valve 50 for controlling the flow rate of additive and which can be manually adjustable or controlled automatically by a suitable conventional control system. In the preferred embodiment, the color additive supply means can further include a color additive supply divider 52 such as a simple "T" piece which divides the color additive supply into an upper and lower supply lines 54 and 56 that feed into the upper and lower first segment housing elements 23 and 25 respectively.

Referring now once again to FIG. 1, it is seen that each substream passageway 37 and 39 contains a number of stationary in-line static mixer or flight elements such as elements 59 visible. In-line static mixer flight elements 59 should have a diameter approximately equal to the diameter of the subpassageway in which they are disposed. The in-line static mixer elements rapidly admix the added color supplied by the color supply means to the dough to form, in preferred embodiments, an homogeneously colored dough phase 62.

Importantly, mixing is accomplished without imparting significant amounts of additional shear into the dough. Such in-line static mixer elements are commercially available and are available in a wide variety of lengths, configurations, and shapes. Static mixer elements SMX™ sold by Koch Engineering Company are utilized in the most preferred form.

In the preferred embodiment, each dough substream passageway includes sufficient number of in-line static mixer elements to provide homogeneously colored dough substreams such as of a first color 57 and second color 62. FIG. 1 thus shows the original color phase of extrudable food product 11, an intermediately or partially mixed or marbled dough of first color 53 and the homogeneously colored dough phase of first color 57. Similarly, FIG. 1 depicts a partially mixed dough phase of a second color 61 and the homogeneously colored dough phase of second color 62.

In other embodiments such as when a marbled or incompletely admixed dough is desired, the same apparatus can be used but employing fewer of the removable in-line static mixer elements.

Intermediate in-line static mixer section 19 can be of various lengths to accommodate one or more flight elements 59. By way of illustration and not of limitation, each subpassageway can conveniently be about 50 mm in diameter (apx two inch ID). The length of the subpassageway can be about 1 to 3 meters (1,000 to 3,000 mm), giving a length to diameter ("L/D") value of about 20 to 60. More broadly, the L/D value can range from about 10 to 100. However, higher L/D values are undesirable in that higher extruder pressures are required to overcome the resistance presented by such lengths of in-line static mixers. Generation of such pressures within extruder 12 can result in imparting more undesirable shear to the cooked cereal dough. Sufficient number of in-line flight elements 59 each ranging in length from 10 cm to 50 cm are used to fill the subpassageway. It will be appreciated that the pressure and temperature conditions within the intermediate in-line static mixer section 19 will be substantially comparable to that within the twin screw extruder unless section 19 is supplied with supplemental heating or cooling.

Now that the basic construction of the apparatus 10 according to the preferred teachings of the present invention has been set forth, the operation of apparatus 10 can be explained and appreciated. Specifically, farinaceous dough whether uncooked (e.g., for pasta or cookies) or, preferably cooked (e.g., for an RTE cereal, pet food, cookies, crackers) or confectionery (e.g., for a dried fruit piece) is advanced by the action of the twin screw extruder in a continuous stream to flow through the subpassageways 37 and 39. A first colorant, flavorant, and/or similar additive is continuously added to the dough substream in subpassageway to form a first unmixed or incompletely mixed additive/dough blend. Similarly, a second colorant, flavorant, and/or similar additive is added to the dough substream in subpassageway 39. As the doughs and colorant blend advance through the in-line static mixer elements, the blend is thereby admixed to form an homogeneously admixed blend. The separate, colored homogeneously admixed dough streams are then extruded through the die ports 40 for each subpassageway 37 and 39 to form separate dough extrudate streams.

In embodiments of the present invention, the dough extrudate substreams can be cut just prior to or during substantial expansion or puffing of the dough, such as in the production of puffed snacks and puffed ready-to-eat cereals. In the production of unpuffed ready-to-eat cereal products, for example, the dough is preferably cut prior to any substantial expansion to form pellets. The pellets can then be transferred such as by a conveyor belt to an oven for toasting and tenderizing into finished ready-to-eat cereal products.

In other variations, the die head 30 can be distally located but operatively connected to the colored and flavored dough substreams. For example, the subpassageways 37 and 39 can be extended to provide extended residence time to the dough to impart more cook time and flavor or to connect the extruder to another piece of equipment, e.g., a pellet former for forming the dough substreams into pellets, e.g., flakes.

The finished product pieces so formed can then be processed in conventional manner (e.g., puffed and/or sugar coated, vitamin fortified, toasted flavor coated, e.g., with cheese powder) to form final consumer products.

For those embodiments in which the dough conditions of temperature, pressure and moisture provide for direct expansion upon extrusion to form puffed cereal based snacks or RTE cereals, an advantage is that the extrudate expanded products naturally intermix to form an admixed blend of pieces of the two or more colors or flavors.

For example, a mixture of red berry flavored pieces and purple grape flavored pieces can be prepared. The blends so formed have more uniform properties by virtue of similar processing conditions and hold times. Also, the blends of different pieces exhibit fewer broken or otherwise damaged pieces as a result of eliminating a blending step. The blends have lower levels of cereal dust and fines.

In an alternative embodiment of the present invention as shown in FIGS. 6 and 7, apparatus 10 includes a head or manifold 118 for dividing the dough stream of extruder 12 into six substreams. In particular, manifold 118 includes an upstream face 80 and a downstream face 82. Manifold 118 is suitably secured to extruder 12 such as by the means shown with upstream face 80 abutting with the downstream face of extruder 12. Manifold 118 includes a first frustoconical-shaped passage 84 which terminates in a cylindrical-shaped passage 86. Passage 84 extends from face 80 towards but spaced from face 82 and receives the extrudable food material being advanced by screw auger 15. Passage 86 extends from passage 84 towards but spaced from face 82, with passage 86 terminating approximately midway between faces 80 and 82 in the most preferred form.

Manifold 118 according to the preferred teachings of the present invention includes a plurality of radially extending, equally circumferentially spaced bores 88 extending from the outer periphery and intersecting with passage 86. In the most preferred form, 6 bores 88 are provided, with 4 being visible in FIG. 6. Manifold 118 further includes a plurality of axially extending passageways 90 extending from face 82 and terminating in bores 88. Passageways 90 in the preferred form are arranged in a circular pattern on face 82, with passageways 90 being equally circumferentially spaced.

Bores 88 are counterbored from the periphery of manifold 118 to a point radially outward of the intersection with passageways 90 for threadably receiving a cylindrical-shaped plug 92. Suitable means such as O-rings 94 as shown can be provided for sealing between plugs 92 and bores 88 to prevent the escape of extrudable food material therebetween. The inner surfaces of plugs 92 each threadably receive the stem 96 of a restrictor 98. The inner radial ends of stems 96 terminate in a pear-shaped head 100. Suitable means such as O-rings 102 as shown can be provided for sealing between stems 96 and the inner surfaces of plugs 92 to prevent the escape of extrudable food material therebetween.

In the most preferred form, bores 88 each include a frustoconical-shaped seat 104 adjacent to their interconnection to passage 86. It can then be appreciated that stems 96 can be rotated in plugs 92 to adjust the position of head 100 relative to seat 104 between an abutting position which prevents passage of extrudable food material from passage 86 into bores 88 to a retracted position where extrudable food material is allowed to pass from passage 86 into bores 88 and around head 100. It should be appreciated that the further that head 100 is withdrawn from seat 104 the greater the rate of flow of the extrudable food material. Further, it should be appreciated that each of the restrictors 98 can be independently adjusted so that the flow of extrudable food material through each of the bores 88 can be adjusted. In the most preferred form, it is desired for the flow of extrudable food material to be generally equal through all of bores 88.

In the most preferred form, each passageway 90 includes its own independent color or flavor additive supply 106. Supply 106 is in fluid communication with and manifold 118 further includes means for adding the additive at multiple locations within the flow of extrudable food material such as a die insert 108 shown. In the preferred form, each passageway 90 includes an enlarged size counterbore 110 extending axially from face 82 towards but spaced from bores 88 and at a distance generally equal to the axial length of die insert 108.

In the most preferred form, die insert 108 is generally of the type shown and described in application U.S. Ser. No. 08/353,477. In particular, die insert 108 includes means for imparting at least one and more desirably a plurality of dough interstitial gaps such as a plurality of dough dividing passageways such as passageways 112 and 114 formed by die dividing members. Die insert 108 can further include means for injecting the additive into the interstitial dough gaps such as a plurality of injection ports 116. Die insert 108 can further include a supply reservoir 119 supplied by supply 106, with reservoir 119 defined by the outer surface of die insert 108 and counterbore 110, with suitable means such as O-rings 120 preventing escape of the additive therebetween. Reservoir 119 is in fluid communication with ports 116 by suitable passageways 121 extending through the die dividing members defining passageways 112 and 114. It should then be appreciated that the additive is not simply placed at the outer surface of the flow of extrudable food material but is placed through the entire area and more even mixing of the additive with the extrudable food material can occur. Apparatus 10 according to the teachings of the present invention further includes one or more middle segments 122 having a generally cylindrical outer surface in the most preferred form. Each middle segment 122 includes a plurality of axially extending subpassageways 124 of a number, location, and arrangement corresponding to passageways 90. Subpassageways 124 have a size smaller than die inserts 108. The first middle segment 122 is suitably secured to manifold 118 such as by the means shown with the upstream face of middle segment 122 abutting with downstream face 82 of manifold 118. It can then be appreciated that die inserts 108 are axially captured by being sandwiched between the upstream face of middle segment 122 and the upstream axial end of counterbores 110. Each subpassageway 124 contains a number of stationary in-line static mixer or flight elements 59.

In the most preferred form, each middle segment 122 is of a unique construction allowing access to static mixer elements 59. Specifically, in the most preferred form of the present invention, middle segment 122 is formed of a central plug 122a and an outer sleeve 122b. Central plug 122a has planar first and second ends, with the first end for abutment with downstream face 82 of manifold 118. Central plug 122a further includes an outer frustoconical surface. Sleeve 122b has planar first and second ends, with the first end for abutment with downstream face 82 of manifold 118. Sleeve 122b further includes an outer surface which is generally cylindrical in the preferred form and an inner frustoconical surface of a size and shape for slideably receiving and abutment with the outer frustoconical surface of central plug 122a. During the formation of middle segment 122, central plug 122a is slideably received in sleeve 122b with the outer frustoconical surface of central plug 122a abutting with the inner frustoconical surface of sleeve 122b. Subpassageways 124 which in the most preferred form are of a circular cross section are then bored or drilled with their axes generally located along the frustoconical surfaces of plug 122a and sleeve 122b so that generally half of each of the subpassageways 124 is formed in plug 122a and the other half is formed in sleeve 122b. It should then be appreciated that with the centers of subpassageways 124 located on the frustoconical surfaces of plugs 122a and sleeve 122b, the centers of subpassageways 124 have gradually decreasing spacing as best seen in FIG. 6 from the first ends to the second ends of plug 122a and sleeve 122b.

It should then be appreciated that in the event that one or more subpassageways 124 should become plugged, for example which could occur in the event of an extended power outage, it can be very difficult to nearly impossible to force the plugged dough with static mixer elements 59 axially through subpassageways 124. According to the teachings of the present invention, with middle segment 122 removed from apparatus 10, plug 122a can be forced out of sleeve 122b such that middle segment 122 is thus in two individual components. Typically, static mixer elements 59 and the plugged dough will remain in the halves of subpassageways 124 formed in sleeve 122b. Access can then be obtained along the entire longitudinal lengths of subpassageways 124 by reaching in the open ends of sleeve 122b or on the outer frustoconical surface of plug 122a. Thus, it can be appreciated that access is allowed to the interior of subpassageways 124, static mixer elements 59, and/or any dough located therein along the entire longitudinal lengths of subpassageways 124.

As shown in FIGS. 6 and 7, suitable handling bores can be provided in the ends of plug 122a to assist in the handling of plug 122a including when inserting or removing plug 122a from sleeve 122b. It should further be appreciated that the frustoconical shape of the outer surface of plug 122a and the inner surface of sleeve 122b is advantageous in creating increased spacing between such surfaces as sleeve 122b is moved downstream relative to plug 122a during disassembly of middle segment 122. Similarly, during operation of apparatus 10, dough flowing through subpassageways 124 will tend to push plug 122a downstream relative to sleeve 122b to more firmly abut the frustoconical surfaces of plug 122a and sleeve 122b together.

Each middle segment 122 includes first and second, axially spaced, annular shoulders 126 extending radially from the outer surface of sleeve 122b. Shoulders 126 in the preferred form are located adjacent to but slightly axially inward of the axial ends of middle segment 122 to allow securement of middle segment 122 to upstream and downstream elements. A water jacket 128 is partially formed by and held between shoulders 126 for circulation of a heat transfer medium such as water for adding heat to middle segment 122 and thus to the extrudable food material flowing through subpassageways 124 thereof.

Apparatus 10 according to the preferred teachings of the present invention includes a transition plate 130 having a plurality of axially extending bores 132 of a size, number, location, and arrangement corresponding to subpassageways 124 of middle segments 122. An adapter element 134 is suitably secured to transition plate 130 such as by bolts extending through element 134 and threaded into plate 130. The last middle segment 122 is suitably secured to adaptor element 134 such as by the means shown with the downstream face of middle section 122 abutting with the upstream face of adapter element 134. Adapter element 134 includes a plurality of axially extending bores 136 which can include wear sleeves of a size, number, location, arrangement, and extending between bores 132 and subpassageways 124.

In apparatus 10 of FIG. 6, die head 30 is generally cup shaped and is suitably secured to the opposite side of transition plate 130 than adapter element 134 such as by the means shown. Die ports 40 of a number and arrangement corresponding to bores 132 are provided in outer die face 31 but of a smaller size and in the preferred form have axes at greater radial distance than the axes of bores 132. A registration section 138 is provided having a shape and size corresponding to and for receipt within die head 30. Section 138 includes connecting passages 140 extending between and in communication with bores 132 and ports 40, with passages 140 decreasing in size and being generally funnel shaped between bores 132 and ports 40. It should then be appreciated that passages 84, 86 and 140, bores 90, 132 and 136, passageways 112 and 114, subpassageways 124, and ports 40 are generally contiguous and do not present shoulders or similar projections in the flow of extrudable food material to minimize buildup and hardening. Die head 30 is suitably secured to transition plate 130 such as by the means shown opposite to adapter element 134, with registration section 138 sandwiched between die head 30 and transition plate 130. Apparatus 10 of FIG. 6 further includes in the most preferred form a conventional face rotary cutter 36 having at least one rotating cutter knife 38 for severing the extrudate ropes into individual pieces 41.

Operation of apparatus 10 of FIGS. 6 and 7 is substantially the same as that for FIGS. 1–3 aside from the number of dough substreams produces, with 6 being produced in the preferred form. It can then be appreciated that the admixed blend produced can be of two to six colors or flavors and/or at differing ratios. As an example, apparatus 10 could produce three dough substreams of red berry flavor cut in pieces of the same or different shapes, two dough substreams of purple grape flavor cut in pieces of the same or different shapes, and one dough substream of yellow lemon flavor cut in pieces.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. An apparatus for producing multiple extrudates formed from a single product mass stream comprising, in combination: means for supplying a single extrudable food product mass stream; means operatively connected to the product mass supplying means for dividing the extrudable food product mass stream into at least a first mass substream disposed within a first subpassageway having an interior surface and a second mass substream disposed within a second subpassageway having an interior surface, with each subpassageway having an exit port for extruding the product mass substream into an extrudate rope; first supplying means for supplying a first additive exclusively to the first mass substream without communication to the other mass substreams; and first mixing means disposed within the first mass substream downstream from the first additive supply means for mixing the first additive with the first mass substream prior to the exit port.

2. The apparatus of claim 1 additionally comprising, in combination: second supplying means for supplying a second additive to the second mass substream without communication to the other mass substreams, with the second additive being different from the first additive; and second mixing means disposed within the second mass substream downstream from the second additive supply means for mixing the second additive with the second mass substream prior to the exit port.

3. The apparatus of claim 2 wherein each additive supply means includes a supply line operatively connected between a fluid supply reservoir and the mass substream and means for controlling the additive flow rate to the mass substream.

4. The apparatus of claim 3 wherein the product mass supplying means includes an extruder having a main passageway therein, said main passageway having a discharge outlet; and wherein the dividing means comprises a manifold operatively connected to the extruder discharge outlet, said manifold having exit ports equal in number to the number of subpassageways, and a housing disposed within which are the subpassageways.

5. The apparatus of claim 4 wherein the housing includes an inlet segment, outlet segment and at least one middle segment removably fastened together.

6. The apparatus of claim 5 wherein each segment includes an upper segment element and a lower segment element removably fastened to the upper segment element for providing access to the subpassageways.

7. The apparatus of claim 6 wherein the mixing means comprises sufficient numbers of in-line static mixer flight elements to homogeneously admix the additive and the mass substream.

8. The apparatus of claim 6 wherein the interior surface of at least one subpassageway includes a treatment to minimize build-up or sticking of the extrudable food product.

9. The apparatus of claim 8 additionally comprising, in combination: means for sectioning the extrudate ropes into individual pieces.

10. The apparatus of claim 3 wherein each additive supply means further includes an additive divider downstream of the controlling means for dividing the supply line into first and second portions operatively connected to differing locations of the mass substream.

11. The apparatus of claim 2 further comprising, in combination: means for providing heat transfer to the mass substreams in the mixing means.

12. The apparatus of claim 1 wherein the first additive supply means comprises, in combination: means for imparting at least one interstitial gap in the first mass substream; and means for injecting the first additive into the interstitial gap.

13. The apparatus of claim 1 wherein the dividing means includes a first restrictor for adjusting the flow of the extrudable food product mass stream into the first mass substream.

14. The apparatus of claim 13 wherein the dividing means further includes a second restrictor for adjusting the flow of the extrudable food product mass stream into the second mass substream, with the second restrictor allowing independent adjustment from the first restrictor.

15. The apparatus of claim 1 wherein the dividing means divides the extrudable food product mass stream into a multiplicity of mass substreams arranged in a circular pattern and being equally circumferentially spaced.

16. The apparatus of claim 1 wherein the dividing means includes an axially extending passage for receiving the single extrudable food product mass stream; and a plurality of radially extending, equally circumferentially spaced bores intersecting with the axially extending passage, with the subpassageways intersecting with and extending axially from the radially extending bores.

17. The apparatus of claim 16 further comprising, in combination: a plurality of independently adjustable restrictors, with the restrictors being positioned within and movable parallel to the radially extending bores.

18. A method for producing multiple extrudates from a single product mass stream comprising the steps of:
A. providing a single extrudable food product mass stream;
B. dividing the extrudable food product mass stream into at least a first and a second food product mass substream disposed within separate subpassageways;
C. adding a first flowable additive exclusively to the first food mass substream without communication to the other substreams to form a first unmixed substream blend;
D. admixing the first unmixed substream blend without imparting shear to form a first mixed substream blend;
E. extruding the first mixed substream blend through a die port to form a first extrudate stream; and
F. simultaneously extruding the second substream through a die port to form a second extrudate stream.

19. The method of claim 18 additionally comprising the steps of:
G. adding a second flowable additive exclusively to the second food mass substream without communication to the other substreams to form a second unmixed substream blend, with the second additive being different than the first additive; and
H. admixing the second unmixed first substream blend without imparting shear to form a second mixed substream blend prior to the step of simultaneously extruding the second substream through the die port.

20. The method of claim 19 wherein step D is practiced for forming an homogeneously mixed first substream.

21. The method of claim 19 wherein step H is practiced to form an homogeneously mixed second substream.

22. The method of claim 21 wherein the food mass is selected from the group consisting of uncooked cereal doughs, cooked cereal doughs, fruit pastes, cheeses, and potato dough.

23. The method of claim 22 wherein the food mass is a cooked cereal dough.

24. The method of claim 23 additionally comprising the step of:
I. severing the first and second extrudate streams for forming a blend of first and second pieces.

25. The method of claim 24 wherein steps E and F are practiced to puff the first and second extrudate streams.

26. The method of claim 19 additionally comprising the step of providing heat transfer to the mass substreams during admixing.

27. The method of claim 18 wherein the adding step comprises the step of adding the flowable additive to at least two locations in the mass substream.

28. The method of claim 27 wherein the adding step comprises the steps of: imparting at least one interstitial gap in the mass substream; and injecting the flowable additive into the interstitial gap.

29. The method of claim 18 wherein the dividing step includes the step of independently and adjustably restricting the flow of the mass stream into the substreams.

30. Dough section comprising, in combination: a plug having an outer surface, a first end and a second end; a sleeve having an inner surface, a first end and a second end; with the inner surface of the sleeve being of a size and shape for slideably receiving and for abutment with the outer surface of the plug; and at least a first subpassageway having a length extending along the outer surface of the plug and the inner surface of the sleeve with a first portion of the subpassageway formed in the plug along the entire length of the subpassageway and a second portion of the subpassageway formed in the sleeve along the entire length of the subpassageway allowing access to the entire length of the subpassageway when the plug is slid from the sleeve.

31. The dough section of claim 30 further comprising, in combination: static mixer elements located in the subpassageway, with access to the static mixer elements being allowed when the plug is slid from the sleeve.

32. The dough section of claim 31 wherein the outer surface of the plug is frustoconical shaped.

33. The dough section of claim 32 wherein the subpassageway has an axis extending along the outer surface of the plug.

34. The apparatus of claim 1 further comprising, in combination: a dough section comprising, in combination: a plug having an outer surface, a first end and a second end; and a sleeve having an inner surface, a first end and a second end, with the inner surface of the sleeve being of a size and shape for slideably receiving and for abutment with the outer surface of the plug, and with each of the first and second subpassageways having a length extending along the outer surface of the plug and the inner surface of the sleeve with a first portion of the subpassageway formed in the plug along the entire length of the subpassageway and a second portion of the subpassageway formed in the sleeve along the entire length of the subpassageway allowing access to the entire length of the subpassageway when the plug is slid from the sleeve.

* * * * *